US009503618B2

(12) United States Patent
Wendler (10) Patent No.: US 9,503,618 B2
(45) Date of Patent: Nov. 22, 2016

(54) CAMERA SYSTEM FOR MONITORING A SPACE AREA (75) Inventor: Martin Wendler, Stuttgart (DE)

(73) Assignee: PILZ GMBH & CO. KG, Ostfildern (DE)

( * ) Notice: Subject to any disclaimer, the term of this patent is extended or adjusted under 35 U.S.C. 154(b) by 1755 days.

(21) Appl. No.: 12/425,021

(22) Filed: Apr. 16, 2009

(65) Prior Publication Data
US 2009/0309969 A1 Dec. 17, 2009

Related U.S. Application Data (63) Continuation of application No. PCT/EP2007/008893, filed on Oct. 12, 2007.

(30) Foreign Application Priority Data

Oct. 17, 2006 (DE) .................. 10 2006 050 235

(51) Int. Cl.
| H04N 9/47 | (2006.01) |
| H04N 7/18 | (2006.01) |
| H04N 5/225 | (2006.01) |
| F16M 11/04 | (2006.01) |
| F16M 11/06 | (2006.01) |
| F16M 11/10 | (2006.01) |
| F16M 11/20 | (2006.01) |
| F16M 13/02 | (2006.01) |
| F16P 3/14 | (2006.01) |

(52) U.S. Cl.
CPC .......... *H04N 5/2251* (2013.01); *F16M 11/041* (2013.01); *F16M 11/06* (2013.01); *F16M 11/10* (2013.01); *F16M 11/2014* (2013.01); *F16M 13/02* (2013.01); *F16M 13/027* (2013.01); *F16P 3/14* (2013.01); *F16P 3/144* (2013.01)

(58) Field of Classification Search
None
See application file for complete search history.

(56) References Cited

U.S. PATENT DOCUMENTS

| 5,003,401 | A | * | 3/1991 | Otsuka .......................... 348/374 |
| 5,937,212 | A | * | 8/1999 | Kurahashi et al. ............. 396/20 |
| 7,200,246 | B2 | * | 4/2007 | Cofer et al. ................... 382/103 |
| 7,458,735 | B2 | * | 12/2008 | Souma et al. ................. 396/351 |
| 8,023,016 | B2 | * | 9/2011 | Iijima et al. .................. 348/265 |
| 2002/0021503 | A1 | | 2/2002 | Osterried |
| 2003/0025826 | A1 | | 2/2003 | Nakajoh |
| 2003/0057426 | A1 | * | 3/2003 | Miyazaki et al. .............. 257/88 |
| 2005/0099520 | A1 | | 5/2005 | Cheng |
| 2006/0139475 | A1 | | 6/2006 | Esch et al. |
| 2007/0097231 | A1 | | 5/2007 | Schnaithmann |

FOREIGN PATENT DOCUMENTS

| DE | 199 38 639 A1 | 2/2001 |
| DE | 10 2004 020 331 B3 | 10/2005 |
| DE | 10 2004 020 998 A1 | 11/2005 |

(Continued)

*Primary Examiner* — Mehrdad Dastouri
*Assistant Examiner* — Jared Walker
(74) *Attorney, Agent, or Firm* — Harness, Dickey & Pierce, P.L.C.

(57) ABSTRACT

A camera system for monitoring a space area has a camera unit including an image sensor and a number of optical elements which form an imaging optics. A system body has at least one receptacle for the camera unit. A mounting part serves for aligning the system body relative to the space area. The optical elements are fastened on an objective body which has a mounting flange. The objective body is fastened in the receptacle by means of the mounting flange.

30 Claims, 5 Drawing Sheets (56) References Cited

FOREIGN PATENT DOCUMENTS

| | | |
|---|---|---|
| EP | 0 505 635 A2 | 9/1992 |
| EP | 1 686 790 A1 | 3/2004 |
| EP | 1 543 270 | 6/2005 |
| JP | 60-4071 | 1/1985 |
| JP | 5-22640 | 1/1993 |
| JP | 9-90489 | 4/1997 |
| JP | 10-145649 | 5/1998 |
| JP | 11-237684 | 8/1999 |
| JP | 2000-65532 | 3/2000 |
| JP | 2000-89122 | 3/2000 |
| JP | 2001-264867 | 9/2001 |
| JP | 2001264867 A * | 9/2001 |
| JP | 2001-281754 | 10/2001 |
| JP | 2002-27311 | 1/2002 |
| JP | 2002-48962 | 2/2002 |
| JP | 2002-219684 | 8/2002 |
| JP | 2003-86779 | 3/2003 |
| WO | WO2006068129 A1 * | 6/2006 |
| WO | WO 2006068129 A1 * | 6/2006 |

* cited by examiner

CAMERA SYSTEM FOR MONITORING A SPACE AREA

CROSS REFERENCES TO RELATED APPLICATIONS

This application is a continuation of international patent application PCT/EP2007/008893 filed on Oct. 12, 2007 designating the U.S., which international patent application has been published in German language and claims priority from German patent application DE 10 2006 050 235.3 filed on Oct. 17, 2006. The entire contents of these prior applications are incorporated herein by reference.

BACKGROUND OF THE INVENTION

The present invention relates to a camera system for monitoring a space area, and in particular to a camera system for safeguarding an automated installation arranged in such a space area.

In many industrial and non-industrial applications, movement sequences and/or production processes are carried out in an automated fashion. As a general problem, the automated sequence can constitute a danger to persons or objects present in the region of the automated installation. For safeguarding purposes, use is typically made of light barriers, light grids, laser scanners, safety gates and guard doors. These elements serve the purpose of blocking off the space area around the automated installation. As soon as a light barrier or a light grid is penetrated, or a guard door is opened, the dangerous movement of the automated installation is stopped, or the installation is brought into a safe state in some other way.

However, light barriers, light grids, guard doors and safety gates are limited in their flexibility and require a comparatively high outlay on mounting and installation. Laser scanners are somewhat more flexible, but still remain limited in their ability to distinguish between dangerous and safe situations.

Attempts have therefore been made for some years to employ camera systems in order to safeguard automated installations that are a source of danger. DE 199 38 639 A1, for example, discloses such a device, although the camera still operates in a way similar to a light barrier or a light grid in this case because it monitors a known linear pattern arranged in front of the installation. Recent approaches such as disclosed by EP 1 543 270 B1, for example, attempt to use the camera system to record a three dimensional image of the space area including the monitored installation. Virtual safety gates can then be defined around the installation in a flexible manner by means of a suitable image evaluation.

However, such approaches place high requirements on the resolution and accuracy of the three dimensional image recording. Moreover, the intrinsic safety of the camera system must be ensured, that is to say the safety function may not fail even under unfavorable operating conditions and/or in the event of functional failures of the camera system.

DE 10 2004 020 998 A1 discloses a prior art device and, in particular, a preferred imaging optics for a safety-related camera system. However, this reference does not provide any proposals for a stable and reliable mechanical design of such a camera system, which design ensures the required functional reliability and, moreover, enables cost effective mounting.

Mechanical concepts for the design of cameras are, of course, to be found in other fields of application. For example, reference may be made to US 2003/0025826 A1 and to JP 2000-089 122. These publications contain proposals for the mechanical design of miniaturized cameras such as are used for applications in mobile telephones, personal computers, in motor vehicles or as door spies. However, these camera systems are neither capable, nor envisaged for the purpose, of recording a three dimensional image of a space area in order to safeguard a dangerous installation as a function thereof. In particular, these publications do not contain any proposals for integrating a number of cameras in a cost effective way and with a very high degree of accuracy to form a stereo camera system. In a stereo camera system, two or more cameras are used for generating a three dimensional image of the space area by means of stereo image evaluation. This requires the at least two cameras to be positioned very exactly relative to one another.

SUMMARY OF THE INVENTION

Against this background, it is an object of the present invention to provide a mechanical concept that enables a simple and cost effective mounting of a camera system. In particular, it is an object to provide a mechanical concept that enables a cost effective and reliable mounting of a stereo camera system comprising at least two camera units.

In accordance with one aspect of the invention, there is provided a camera system comprising at least one camera unit having an image sensor and a number of optical elements which form an imaging optics, comprising a system body which has at least one receptacle for the camera unit, and comprising a mounting part for aligning the system body relative to the space area, with the optical elements being arranged in an objective body which has a mounting flange, and with the objective body being fastened in the receptacle by means of the mounting flange. The receptacle and the mounting flange are preferably shaped here to be complementary at least in part, such that the objective body is held form-fit in the receptacle of the system body.

With this camera system, the camera unit, which essentially includes the image sensor (with a plurality of pixels) and the optical elements, is fastened on the system body by its, or on its objective. The objective comprises the optical elements and the objective body, in which the optical elements are fastened. Owing to the fact that the objective body has a mounting flange that is adapted to the receptacle of the system body, the imaging optics of the camera unit are aligned upon mounting on the system body. A high degree of accuracy is enabled in this case by at least partially complementary design of receptacle and mounting flange.

This approach is particularly advantageous when a number of camera units, preferably a number of camera units of the same type, are fastened on a common single-piece system body, because the imaging optics of the various cameras can be aligned with one another with high precision in this way without the need for complicated readjustment. In other words, mounting tolerances in the case of the novel camera system depend substantially on the precision with which the system body and the mounting flange on the objective body can be fabricated. Since both the system body and the objective body are produced in preferred refinements of the invention from dimensionally stable, CNC processed materials, in particular metal, imaging optics of a number of camera units can be aligned very exactly with respect to one another, and in particular parallel to one another. However, the present invention can also be applied to camera systems that have only one camera unit, such as a camera unit that enables an integrated distance measurement to objects in the space area by means of a propagation time measurement of light signals.

Typically, the imaging optics is aligned to the image sensor in the case of conventional mounting of a camera system. Here, the situation is the reverse. The imaging optics provides an exactly defined connection to the system body by means of the mounting flange on the objective body. The mounting of the image sensor follows the associated imaging optics.

The new approach has the further advantage that a camera unit including imaging optics can be replaced relatively easily and, in preferred designs, without particular outlay on adjustment, because the alignment of the replacement unit essentially depends on the manufacturing tolerances of the mounting flange only, which manufacturing tolerances can be kept very small in the case of a CNC processed, metal or metal containing objective body.

In a preferred refinement, the camera unit has a component carrier on which the image sensor is fastened, with the component carrier being fastened on the objective body via at least one conical aligning pin. The at least one conical aligning pin preferably has at its lower end a bearing flange against which the component carrier is pressed in the mounted state. The component carrier is advantageously fastened on the objective body via three conical aligning pins. Moreover, it is preferred for the component carrier to have bores whose edges rest on the bearing flange and in which the aligning pins engage with an oversize. The aligning pin or pins is/are arranged on the objective body in this case.

These preferred refinements simplify the mounting of the image sensor and of the objective body yet further, and they enable a particularly high degree of accuracy in the alignment of the image sensor with the imaging optics. By means of a preferred CNC processing, conical aligning pins can be produced with high accuracy and low manufacturing tolerances from a dimensionally stable material, preferably metal. The use of three aligning pins that engage in three corresponding bores on the component carrier further averages out any mounting tolerances. The implementation of the aligning pins with an oversize and a bearing flange against which the component carrier is pressed (for example by means of screws), leads to a very exactly defined position that enables a high degree of reproducibility without any outlay on adjustment, and a very stable and vibrationproof support. The arrangement of the aligning pins on the objective body is preferred because the component carrier can then be implemented more cost effectively for the image sensor.

In a further refinement, the image sensor (chip) is bonded directly onto the component carrier without a sensor housing.

This refinement has the advantage that the important active pixel surface of the image sensor is exactly aligned with the imaging optics of the camera unit. Mounting tolerances between the image sensor and a sensor housing (not present here) are avoided. Advantageously, the image sensor is directly aligned here with the bores on the component carrier, and not with any other sort of special locating marks, since the influence of manufacturing tolerances on the alignment is thus yet further reduced.

In a further refinement, the component carrier and the objective body form a dustproof encapsulation for the image sensor.

This refinement does not preclude the encapsulation from including one or more seals, particularly in the form of O-rings, or yet a further mounting element such as the carrier ring described below. It has the advantage that the active surface of the image sensor is protected against environmental influences, even when the image sensor is formed without a sensor housing. Moreover, a small and compact camera unit results that is fastened on the system body in a particularly simple and cost effective way, and this also facilitates the later replacement of a defective camera unit.

In a further refinement, the camera system includes a carrier ring on which the at least one conical aligning pin is arranged, the objective body being fastened on the carrier ring in an accurately fitting fashion. The at least one conical aligning pin is preferably formed in one piece with the carrier ring, and this further raises the accuracy during mounting. Furthermore, it is preferred in the present refinements for the objective body to be screwed directly onto the carrier ring. The objective body and the carrier ring in this case respectively have a thread, and the threads are mutually concentric and engage in one another.

These refinements enable a simple axial displacement of the objective body relative to the image sensor, and thereby simple focusing. Moreover, a direct screwing offers a very exact and stable connection between the carrier ring and the objective body.

In a further refinement, the mounting flange is formed in one piece on the objective body. The objective body is preferably rotationally symmetrical, and so it can be produced as a turned part with a single chucking. Consequently, it is preferred that the mounting flange surrounds the receptacle for the optical elements in a substantially concentric fashion.

These refinements enable a particularly simple and cost effective production of the objective body. Moreover, they contribute to a further reduction in mounting tolerances.

In a further refinement, the imaging optics has an entry pupil and the objective body has an outside facing away from the image sensor and lying substantially planar with the entry pupil.

In this refinement, the outside of the objective body forms a system aperture that lies substantially flat against the entry pupil. Such an imaging optics is of great advantage for a camera system of the type mentioned at the beginning because it is possible to effectively master soiling of the camera optics that endangers the reliability of detection. In particular, such an imaging optics has the advantage that a singular instance of soiling of the camera optics does not lead to a singular occlusion of the image sensor.

The outside of the objective body is preferably concentric with the entry pupil, and it is larger by a multiple (factor 10 and higher) than the aperture of the imaging optics, such that the outside forms a part of the "outer wall" of the camera system. This refinement enables a large viewing angle and a simple cleaning of the imaging optics.

In a further refinement, the system body has at least two receptacles for at least a first and a second camera unit, the at least two receptacles being arranged in a defined position and alignment relative to one another. Preferably, the system body is a substantially flat plate in which the at least two receptacles lie in a common plane and at a defined distance from one another.

This refinement is particularly preferred for a stereoscopically operating camera system. It can, however, also be used for camera systems in which a number of camera units are used for reasons of redundancy. In this refinement, the accuracy with which the at least two camera units are positioned and aligned relative to one another depends on the accuracy of the fabrication of the system body. Modern CNC fabrication techniques can achieve very high dimensional stabilities such that the at least two camera units can be mounted relative to one another very cost effectively and with a high precision.

The design of the system body as a substantially flat plate has the ad-vantage that the images recorded by the at least two camera units can easily be converted into one another. However, it is also contemplated that the at least two camera units are aligned at a defined angle to one another.

In a further refinement, the system body has an aligning receptacle for detachably fastening the mounting part. Preferably, the mounting part is an articulated arm that can be displaced along at least one axis and that has a fastening element for fitting the camera system on a building wall or building ceiling, a column, a mast or the like.

The detachable fastening of the mounting part on the system body enables a very simple and cost effective replacement of the camera system without a renewed mechanical alignment.

In a further refinement, the aligning receptacle is a cutout with a circumferential inner edge, with at least three aligning surfaces being arranged along the inner edge, the at least three aligning surfaces lying in a defined position and alignment relative to the at least one receptacle for the camera unit.

Use of at least three separate aligning surfaces along a circumferential inner edge enables a very exactly defined connection of the detachable mounting part to the system body. Moreover, since the at least three locating surfaces lie at an exact position and with an alignment relative to the receptacle for the camera unit, an exact alignment of the camera unit(s) is achieved solely by the mechanical connection between the system body and the mounting part. In conjunction with the refinements already described above, this refinement contributes to the fact that the novel camera system can be mounted without a large outlay on adjustment and, if appropriate, can be replaced—even if a stereoscopic camera system having a number of camera units is involved.

In a further refinement, the at least one receptacle for the camera unit is integrally formed in the system body.

In this refinement, the system body is formed as a single piece with the at least one receptacle. This refinement advantageously contributes to further elimination of mounting tolerances. The precision in the alignment of the camera unit is further raised.

It goes without saying that the features named above and still to be explained below can be used not only in the combination respectively specified, but also in other combinations or on their own without departing from the scope of the present invention.

BRIEF DESCRIPTION OF THE DRAWINGS

Exemplary embodiments of the invention are illustrated in the drawing, and explained in more detail in the following description. In the drawings.

DESCRIPTION OF PREFERRED EMBODIMENTS

Figure 1:
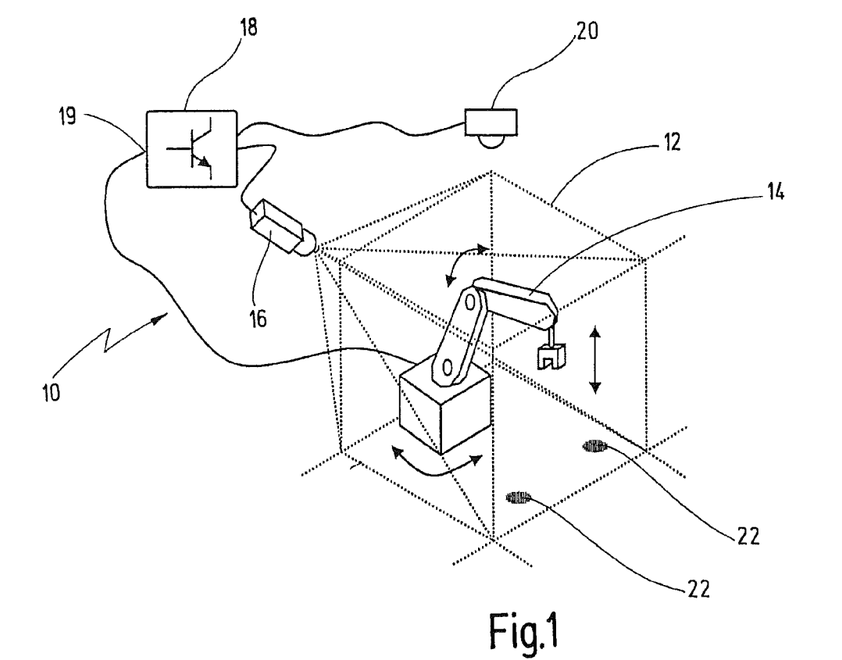
FIG. 1 shows a simplified illustration of a safety device having a camera system according to the present invention.

A device for safeguarding an automated installation in its entirety is designated in FIG. 1 by reference numeral 10. The device 10 monitors a space area 12 in which the automated installation, here a robot 14, is arranged. The device 10 includes a camera system 16 that is directed to the space area 12. The camera system 16 is connected to a controller 18. The controller 18 is designed to evaluate the images of the space area 12 that are recorded by means of the camera system 16, and to stop the robot 14 as a function thereof when a dangerous situation is detected. As an alternative to the illustration in FIG. 1, camera system 16 and controller 18 could also be integrated in a common housing, the controller 18 then using the camera images to generate a switching signal for switching off the installation 14 and to provide it at an output 19.

Reference numeral 20 designates a light source that can optionally be provided to illuminate the space area 12. In some exemplary embodiments of the invention, the light source 20 can serve to generate light signals whose propagation time allows determining the distance to objects in the space area 12. In the currently preferred embodiments, however, the light source 20 merely serves to illuminate the space area 12. A three dimensional detection of the space area 12 is performed by means of a stereoscopic image recording. Consequently, the camera system 16 in the currently preferred exemplary embodiments has at least two camera units, as is explained below with reference to FIGS. 2 to 4.

Reference numeral 22 designates two reference marks that are arranged in the observed space area 12. Reference marks 22 serve in preferred exemplary embodiments to monitor the correct orientation of the camera system 12 as it operates.

Figure 2:
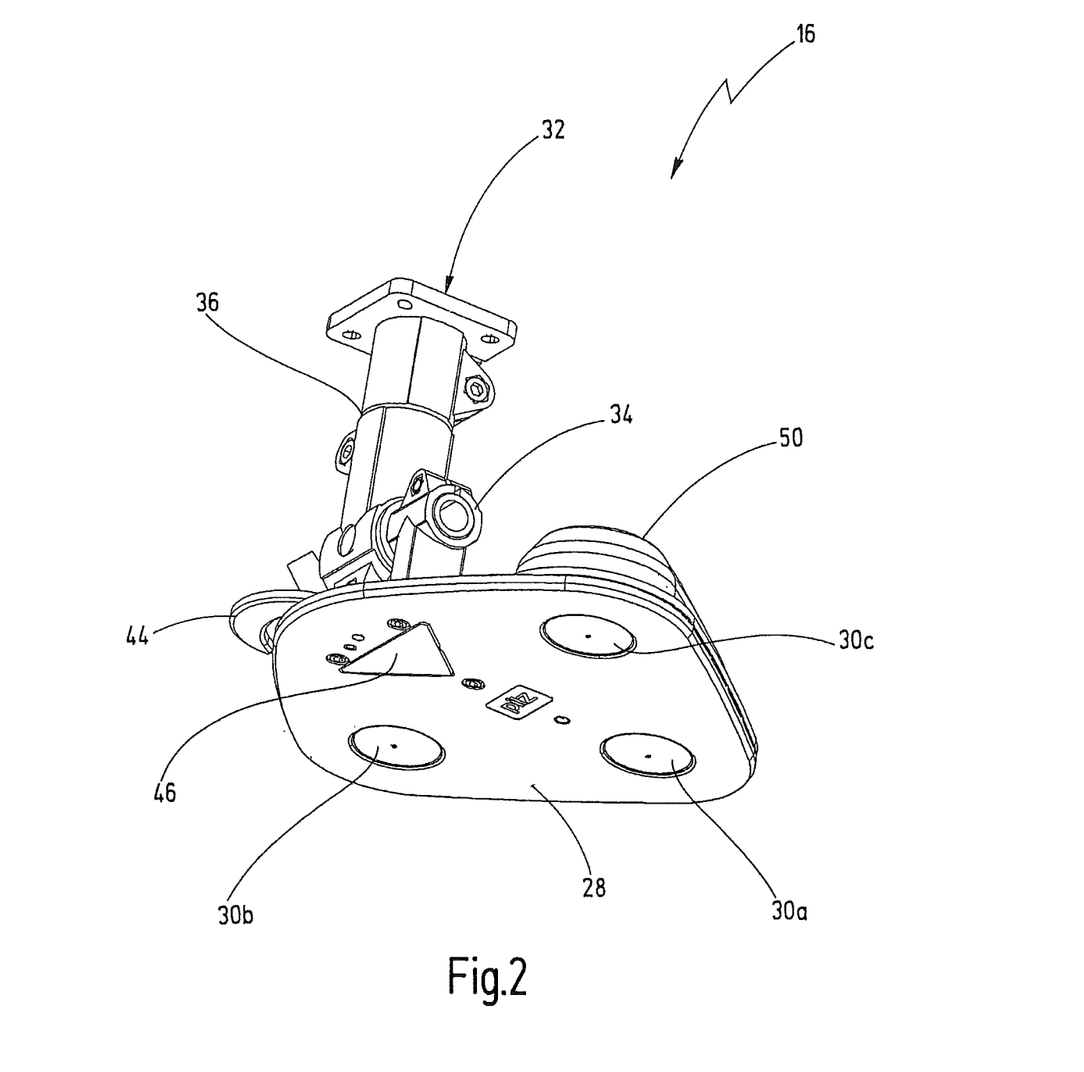
FIG. 2 shows a perspective illustration from obliquely below onto a preferred exemplary embodiment of the novel camera system.
Figure 3:
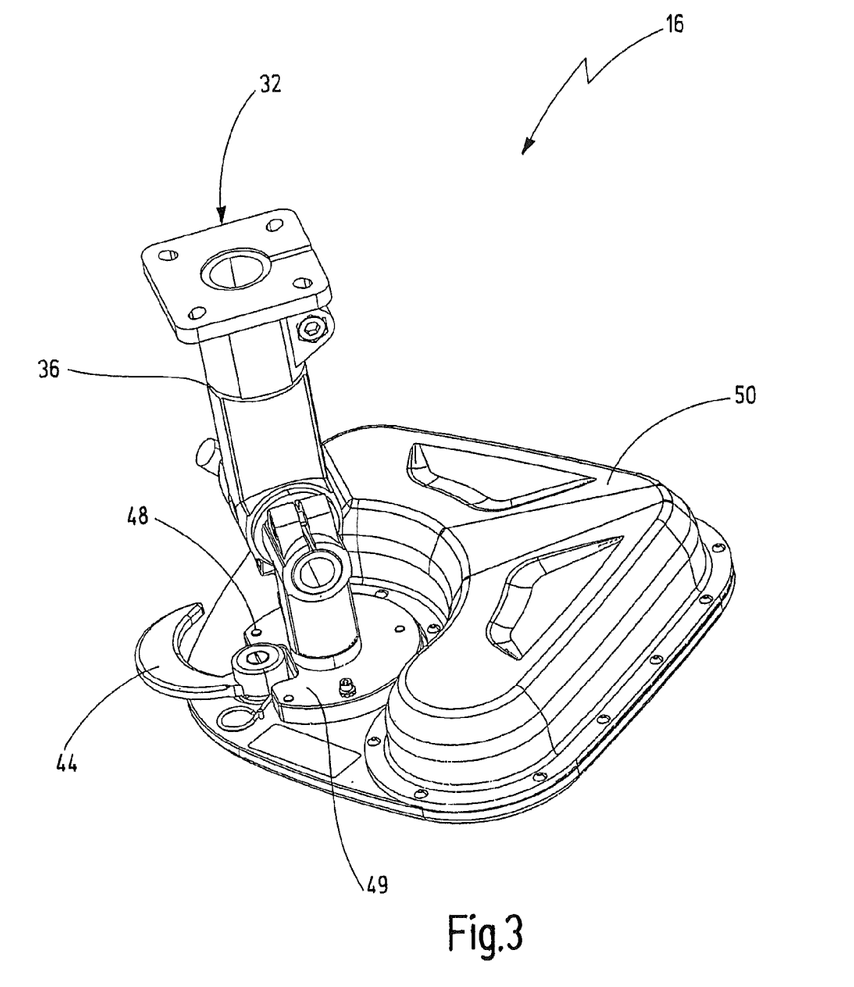
FIG. 3 shows a perspective illustration of the camera system from FIG. 2, but here from obliquely above.
Figure 4:
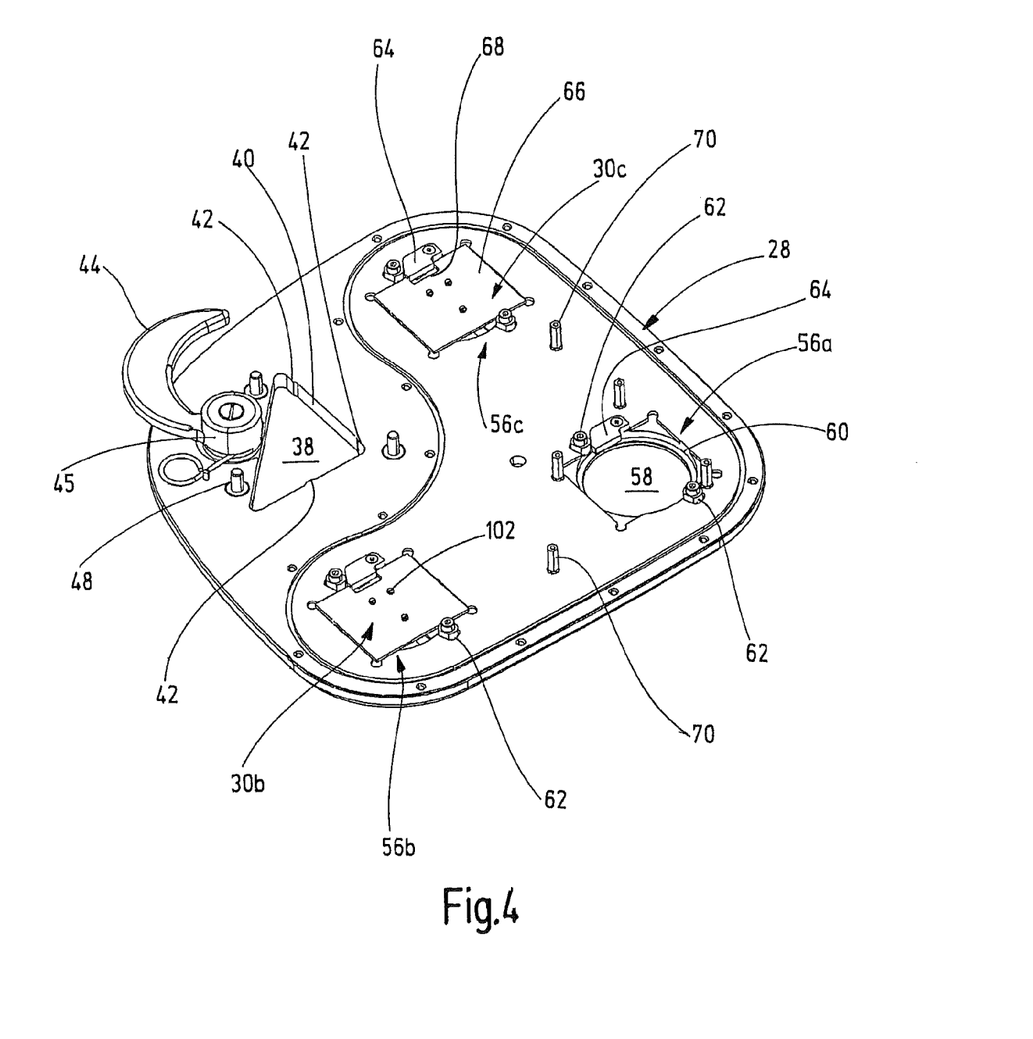
FIG. 4 shows the system body from the camera system of FIGS. 2 and 3 with two of a total of three camera units.

A preferred exemplary embodiment of the camera system 16 is illustrated in FIGS. 2 to 4. The camera system 16 here has a system body 28 (FIG. 4) in the form of a substantially flat plate. The plate 28 has here a base surface 28 is approximately rhombic. Arranged in three of the four "corners" of the system body 28 is a total of three camera units 30a, 30b, 30c whose design is described in more detail further below with reference to FIG. 5. The fastening of the camera units 30 to the system body 28 is explained further below with reference to FIG. 4.

Reference numeral 32 designates a mounting part by means of which the camera system 16 can be fastened on a wall, on a mast or the like (not illustrated here). The mounting part 32 is a mounting arm here with a number of pivot joints 34, 36 that enable the system body 28 to be swiveled about at least two mutually orthogonal rotation axes. The system body 28 has an aligning receptacle 38 for connecting the mounting part 32 to the system body 28 (see FIG. 4). The aligning receptacle 38 comprises a substantially triangular opening or cutout with a circumferential inner edge 40. Formed along inner edge 40 are three separate aligning surfaces 42 that do not lie on one straight line. Each aligning surface 42 is designed here in the form of a stepped elevation along the inner edge 40.

Reference numeral 44 designates a handle that is arranged on an eccentric element 45. The eccentric element 45 can be used to fix a mating part 46 on the lower free end of the mounting arm 32 in the aligning receptacle 38. By means of the locating surfaces 42, the mating part 46 is brought into an exactly defined position relative to the system body 28. In addition, there are three screws 48 arranged on the system body 28, which screws are distributed around the triangular aligning receptacle 38. The screws 48 engage in corresponding threaded bores at the foot 49 of the mounting part 32, and draw the foot of the mounting part 32 against the upper flat surface of the system body 28. Overall, a stable, yet easily releasable connection between the system body 28 and the mounting part 32 is achieved by means of the aligning receptacle 38, the aligning surfaces 42, the mating part 46, the screws 48 and the flat surfaces at the foot 49 and the system body 28, the position of system body 28 and mounting part 32 relative to one another being reproducible here with a high degree of accuracy.

Designated by reference numeral 50 is a hood that is arranged on the rear side of the system body 28. The hood 50 protects the camera units 30a, 30b, 30c and further electronics components by combining with the system body 28 to form a housing for these components.

As illustrated in FIG. 4, in this exemplary embodiment the system body 28 has three receptacles 56a, 56b and 56c into which camera units 30a, 30b and 30c can be inserted, respectively. The receptacles 56a, 56b and 56c are implemented in the form of a through opening 58 that has a stepped edge profile 60. In the preferred exemplary embodiment, the through openings are circular through openings 58 with a closed, circularly extending edge profile 60. The inside diameter of each through opening 58 is larger on the rear side of the system body 28 (the upper side in the plan view in FIG. 4) than on the opposite front side of the system body 28. The stepped edge profile 60 thereby forms a circularly extending flange against which a camera unit 30a, 30b and 30c with a corresponding mating flange can be applied from the rear side of the system body 28.

Arranged on opposite sides of the edge profile 60 are clamping pieces 62, 64 by means of which an inserted camera unit (camera units 30b, 30c in FIG. 4) can be jammed tight in the receptacle 56. In the preferred exemplary embodiment, the clamping pieces 62, 64 grip the rear side of a mounting flange that is described in more detail further below with reference to FIG. 5. The clamping piece 64 engages in this case in a cutout 68 on the component carrier 66, the rotary position of each camera unit 30 also being uniquely fixed inside the receptacle 56.

In this exemplary embodiment, system body 28 has a total of three receptacles 56a, 56b and 56c that define a triangle in the plane of the system body 28. In this exemplary embodiment, the distance of the receptacles 56a, 56b from one another and the distance of the receptacles 56a, 56c from one another are exactly equal and invariable in each case. These two distances respectively form a base width for a stereoscopic evaluation of camera pairs 30a, 30b and 30a, 30c, respectively. In principle, it would also be possible to use camera pair 30b, 30c for a separate stereoscopic evaluation. Owing to the fact that the two stereoscopic camera pairs 30a, 30b and 30a, 30c are not arranged along a common straight line, it is possible to detect objects in the space area 12 that are invisible to an individual camera pair, for example because of occlusion by other objects. Moreover, it is ensured by means of the three camera units that the distance from any desired objects in the space area can be determined. If only two camera units were to be used, it might be impossible to determine the distance from an elongated contour running parallel to the base width.

Figure 5:
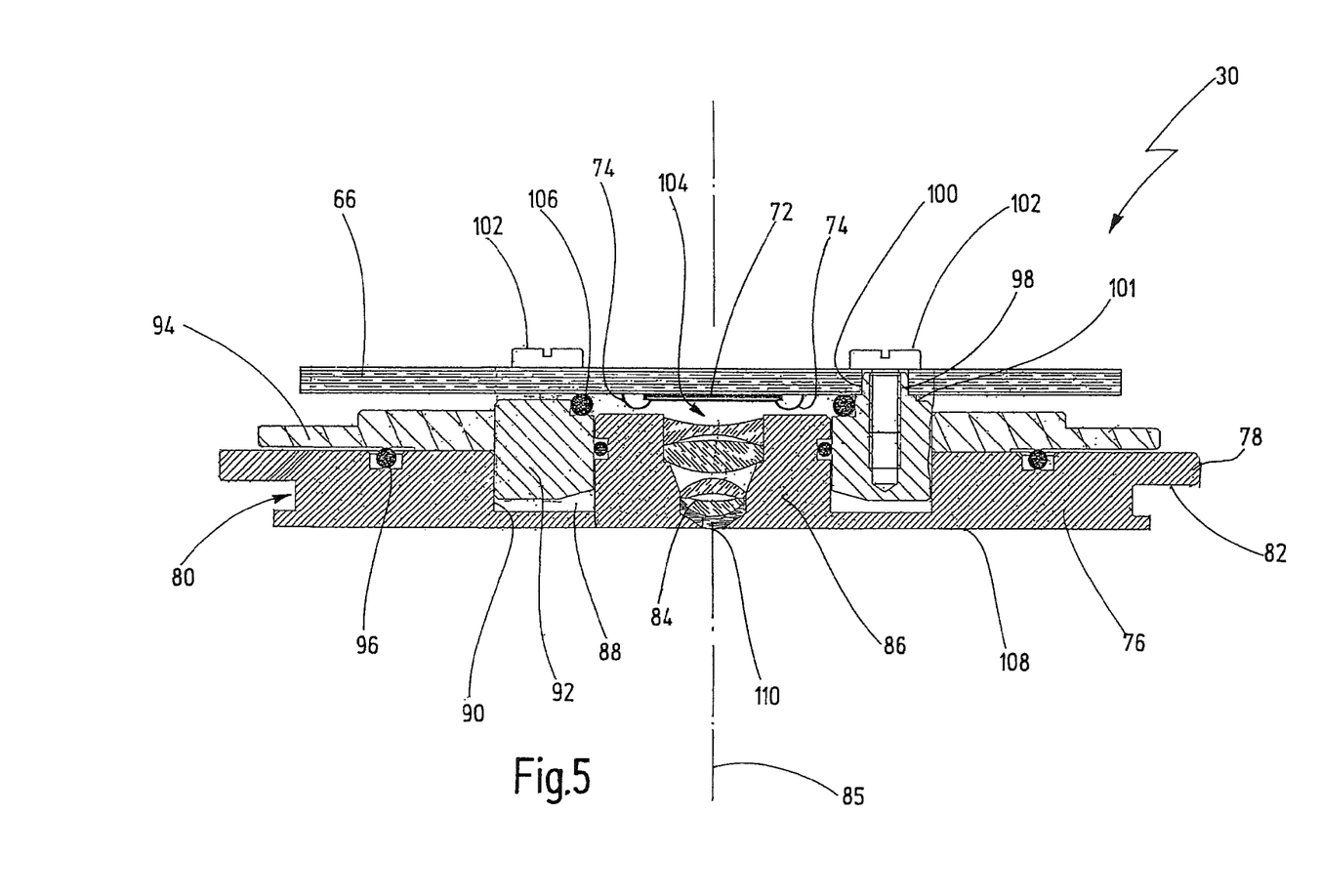
FIG. 5 shows a lateral cross section through a camera unit from the cam-era system of FIGS. 2 to 4.

The mechanical design of the camera units 30 is illustrated in cross section in FIG. 5. Each camera unit 30 has an image sensor 72 with a multiplicity of pixels arranged in a matrix fashion relative to one another. In preferred exemplary embodiments of the invention, it is a CMOS image sensor as described in DE 01 2004 020 331 C1, which is incorporated by reference. The image sensor 72 is arranged on the underside of the component carrier 66. In preferred exemplary embodiments, the image sensor 72 is bonded directly onto the component carrier 66 without a dedicated sensor housing. Appropriate bonding wires are illustrated at reference numeral 74. The semiconductor chip with the image sensor 72 is therefore fastened on the component carrier 66 in a "naked" fashion.

Reference numeral 76 designates an objective body that has a circumferential mounting flange 78. The clamping pieces 62, 64 press the mounting flange 78 into the receptacle 56 from its rear side, lying above in FIG. 5.

In the preferred exemplary embodiment, the objective body 76 is a rotationally symmetrical turned part, and the mounting flange 78 is an outwardly pointing, circumferential flange that determines the maximum outside diameter of the objective body 76. In principle, the objective body 76 could, however, also have an angular basic shape.

Located below the mounting flange 78 is a circumferential annular groove 80. This annular groove 80 serves for holding an O-ring (not illustrated here) during insertion of the camera unit 30 into the receptacle 56 on the system body 28. In this case, the annular surface 82 of mounting flange 78, which points downwardly in FIG. 5, bears against a corresponding mating surface of the edge profile 60.

Located concentrically with the longitudinal central axis of the objective body 76 are receptacles for optical elements 84. In other words, the objective body 76 holds the optical elements 84 of the imaging optics such that the optical axis 85 is identical to the longitudinal central axis of the objective body 76. Here, the optical elements 84 are arranged in a central annular part 86 that is surrounded concentrically by an annular gap 88. The radial outer side 90 of the annular gap 88 has a thread (not illustrated here) by means of which the objective body 76 is screwed onto a carrier ring 92. Reference number 94 designates a lock nut that is screwed above the objective body 76 (that is to say, between the objective body 76 and the component carrier 66) onto the external thread of the carrier ring 92. The lock nut 94 fixes the axial adjustment position of the objective body 76 relative to the component carrier 66 and the image sensor 72. An O-ring 96 is arranged between the objective body 76 and the lock nut 94 in order to achieve a prestress without play.

Together with the optical elements 84, the objective body 76 forms the objective of the camera unit 30. This objective is connected to the component carrier 66 via carrier ring 92. To this end, the carrier ring 92 has three conical aligning pins 98 that engage in corresponding bores 100 in the component carrier 66. In this exemplary embodiment, the aligning pins 98 have an annular bearing flange 101 on which the edge region of each bore 100 rests. Here, the component carrier 66 is pressed against the bearing flange 101 by means of screws 102. In addition, the conical aligning pins 98 have an oversize in the region of the bearing flange 101 with reference to the inside diameter of the bores 100, and so the pins 98 are pressed into the bores 100. In other words, the outside diameter of each aligning pin 98 is slightly larger in the region above the bearing flange 101 than the inside diameter of each bore 100. This gives rise to a positive and particularly shockproof connection.

As is to be seen in the plan view of the camera units 30b, 30c in FIG. 4, the screws 102 and the corresponding aligning pins 98 are arranged such that they define an equilateral triangle at the center of which the image sensor 72 is arranged. In the preferred exemplary embodiments, the image sensor 72 on the component carrier 66 is aligned with the bores 100 (not with any possible markings), in order to minimize mounting tolerances further. Mounting tolerances are virtually eliminated because of the fact that the three bores 100 surround the image sensor 72 and that the aligning pins 98 effect a centering on the basis of their outside cone with oversize.

The component carrier 66 and the objective body 78 form an inner space 104 that is sealed off from the outside in dustproof fashion by means of a further O-ring 106. In preferred exemplary embodiments, the O-ring 106 lies on a circular copper surface (not illustrated here) that is arranged around the image sensor 72 on the underside of the component carrier 66. Furthermore, the O-ring 106 is held in a steplike annular profile of the carrier ring 92. This yields a particularly tight and shockproof encapsulation of the image sensor 72.

Figure 6:
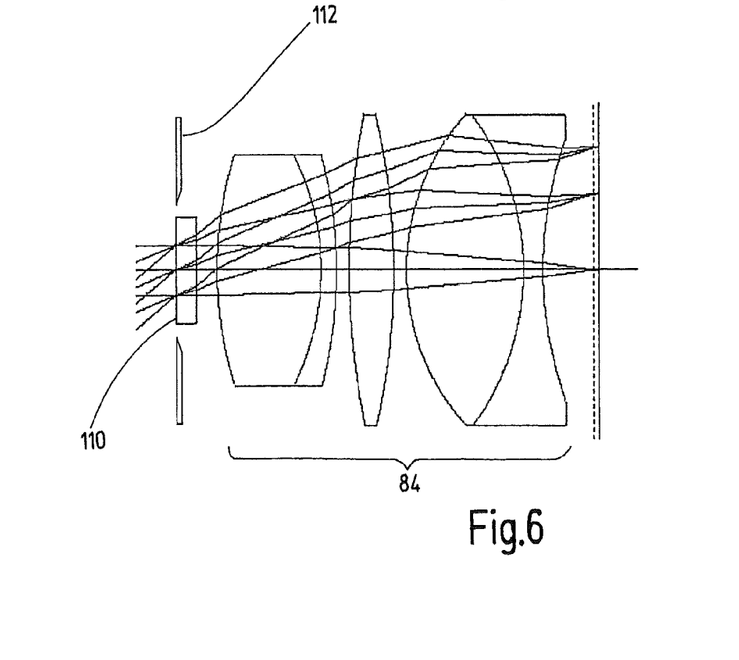
FIG. 6 shows a simplified illustration of an imaging optics for a camera unit in accordance with FIG. 5, including a symbolic illustration of the optically active entry pupil.

Since the camera unit 30 is fastened on the system body 28 by the mounting flange 78, the end face 108 of objective body 76, facing away from the component carrier 66, forms a part of the front side of the camera system 16. In other words, the outside 108 of the objective body 76 is largely visible in the receptacle 56. Located in the center of the outside 108 is the front glass surface 110 of the imaging optics. This front glass surface 110 lies flat against the outside 108 in order to enable easy cleaning of the imaging optics. Moreover, the front glass surface 110 is smaller by a multiple than the outside 108 of the objective body 76 lying concentrically therewith. In addition, the entry pupil 112 of the imaging optics lies on the front glass surface 110, and thus planar with the mechanical system aperture that forms the outside 108 of the objective body 76. This position of the entry pupil 112 is illustrated schematically in FIG. 6 and it enables to avoid a singular occlusion of subregions of the image sensor 72 by a singular piece of soil.

Overall, the effect of the chain of actions comprising: (i) aligning the image sensor with the bores 100,(ii) engaging the aligning pins 98, (iii) screwing the carrier ring 92 onto the objective body 76, (iv) aligning and fixing the camera unit 30 on the mounting flange 78, (v) aligning the receptacles 56 with the locating surfaces 42 and (vi) connecting the mounting part 32 to the system body 28 via the locating surfaces 42, yields a camera system 16 in which the individual camera units 30a, 30b and 30c are mounted and aligned with one another very precisely without additional outlay on adjustment, wherein the accuracy of the alignment and mounting depends on the manufacturing tolerances of the system body 28, of the objective body 76 and of the carrier ring 92. Since these three components are preferably produced by a CNC processing with a very high accuracy, a cost effective and stable construction of the camera system 16 is achieved.

What is claimed is:

1. A camera system for safeguarding an automated installation arranged in a space area, the camera system comprising:
   an integrally formed unitary system body having formed therein a first, a second and a third receptacle, which define a fixed triangle of receptacles,
   a first camera unit arranged in the first receptacle, a second camera unit arranged in the second receptacle, and a third camera unit arranged in the third receptacle, and
   a mounting part for aligning the system body relative to the space area,
   wherein each of the first camera unit, the second camera unit and the third camera unit comprises:
   an image sensor, a component carrier on which the image sensor is fastened, a number of optical elements which form an imaging optics, an objective body on which the optical elements are fixedly arranged, and a carrier ring,
   with the image sensor being directly mounted onto the component carrier and without a sensor housing,
   with the objective body comprising an integrally formed unitary component having a mounting flange via which the objective body is accurately positioned and fastened in one of said first, second, or third receptacles, so that each of said first, second and third camera units is positioned in a predetermined position in said unitary system body relative to the other camera units,
   with the carrier ring comprising at least one conical aligning pin,
   with the component carrier being fastened to the objective body via the at least one conical aligning pin, and
   with the objective body being fastened in an accurately fitting fashion on the carrier ring, so that the image sensor is positioned in a predetermined position relative to said optical elements.

2. The camera system of claim 1, wherein the carrier ring comprises an external thread, where the objective body is screwed onto the external thread, and wherein a lock nut is also screwed onto the external thread between the component carrier and the objective body to fix the position of the optical elements relative to the image sensor and thereby fixedly focus the camera unit.

3. The camera system of claim 2, wherein an O-ring is arranged between the objective body and the lock nut in order to achieve a pre-stress without play.

4. The camera system of claim 1, wherein the component carrier and the objective body form a dustproof encapsulation for the image sensor.

5. The camera system of claim 1, wherein each of said first, second and third receptacles is a through opening having a stepped edge profile for receiving one of the camera units.

6. The camera system of claim 1, wherein the mounting flange is integrally formed on the objective body.

7. The camera system of claim 1, wherein the imaging optics has an entry pupil, and the objective body has an outside facing away from the image sensor and lying substantially planar with the entry pupil.

8. The camera system of claim 7, wherein the outside of the objective body has an outside area which is larger than the entry pupil by a factor of at least 10.

9. The camera system of claim 1, wherein the system body has a fourth receptacle configured for detachably fastening the mounting part.

10. The camera system of claim 9, wherein the fourth receptacle is a cutout with a circumferential inner edge, with at least three aligning surfaces being distributed along the inner edge, with each one from the at least three aligning surfaces lying in a defined position and alignment relative to the at least one receptacle for the camera unit.

11. The camera system of claim 1, further comprising a controller operably connected to the first, second and third camera units, the controller being configured to evaluate images of the space area recorded by the first, second and third camera units, and to produce a safe stop signal for stopping an automated installation as a function of the images.

12. A camera system for monitoring a space area, the camera system comprising at least one camera unit having an image sensor and a number of optical elements which form an imaging optics, the camera system further comprising an integrally formed unitary system body which has at least one receptacle for the camera unit, and comprising a mounting part for aligning the system body relative to the space area, with the optical elements being fixedly arranged in an objective body which has a mounting flange, and with the objective body being fastened in the receptacle by means of the mounting flange which serves to accurately position the objective body in the receptacle and thereby position the camera unit in a predetermined position relative to the system body.

13. The camera system of claim 12, wherein the camera unit has a component carrier on which the image sensor is fastened, with the component carrier being fastened on the objective body via at least one conical aligning pin.

14. The camera system of claim 13, wherein the image sensor is bonded directly onto the component carrier without a sensor housing.

15. The camera system of claim 13, wherein the component carrier and the objective body form a dustproof encapsulation for the image sensor.

16. The camera system of claim 13, further comprising a carrier ring on which the at least one conical aligning pin is arranged, with the objective body being fastened in an accurately fitting fashion on the carrier ring to fix the position of the optical elements relative to the image sensor.

17. The camera system of claim 12, wherein the mounting flange is integrally formed on the objective body.

18. The camera system of claim 12, wherein the imaging optics has an entry pupil, and the objective body has an outside facing away from the image sensor and lying substantially planar with the entry pupil.

19. The camera system of claim 18, wherein the outside of the objective body has an outside area which is larger than the entry pupil by a factor of at least 10.

20. A camera system for safeguarding an automated installation arranged in a space area, the camera system comprising:
    an integrally formed unitary system body having formed therein a first, a second and a third receptacle, which define a fixed triangle of receptacles, wherein each of said first, second and third receptacles has a formed system body mounting feature,
    a mounting part for aligning the system body relative to the space area, and
    a first camera unit arranged in the first receptacle, a second camera unit arranged in the second receptacle and a third camera unit arranged in the third receptacle; wherein each of said first, second and third camera units comprises:
        an image sensor, a component carrier on which the image sensor is fixedly mounted, a plurality of optical elements forming imaging optics, and an objective body,
    wherein said objective body has three formed mounting features comprising:
        a first mounting feature for mounting said plurality of optical elements,
        a second mounting feature for connecting said component carrier to the objective body so that the image sensor mounted to said component carrier is positioned in a predetermined position relative to said optical elements, and
        a third mounting feature configured to cooperate with said system body mounting feature to accurately position the objective body in one of said first, second and third receptacles,
    wherein each of said first, second and third camera units is positioned in a predetermined position in said unitary system body relative to the other camera units.

21. The camera system of claim 20, wherein the component carrier is connected to the objective body via a carrier ring having at least one conical aligning pin configured to cooperate with said second mounting feature of said objective body.

22. The camera system of claim 21, wherein the image sensor is bonded directly onto the component carrier without a sensor housing.

23. The camera system of claim 21, wherein the component carrier and the objective body form a dust-proof encapsulation for the image sensor.

24. The camera system of claim 20, wherein said third mounting feature of said objective body comprises a mounting flange that is integrally formed on said objective body.

25. The camera system of claim 20, wherein said mounting part has a formed mounting part mounting feature and said unitary system body has a fourth formed receptacle configured to cooperate with said mounting part mounting feature to detachably fasten the system body to said mounting part.

26. The camera system of claim 1, wherein said system body and said objective body are produced from dimensionally stable material and further wherein said first, second and third receptacles of said system body and said mounting flange of said objective body are formed via a CNC machining process.

27. The camera system of claim 12, wherein the objective body consists of an integrally formed unitary component.

28. The camera system of claim 27, wherein said system body and said objective body are produced from dimensionally stable material and further wherein said at least one receptacle of said system body and said mounting flange of said objective body are formed via a CNC machining process.

29. The camera system of claim 20, wherein the objective body consists of an integrally formed unitary component.

30. The camera system of claim 29, wherein said system body and said objective body are produced from dimensionally stable material and further wherein said first, second and third receptacles of said system body and each of said first, second and third mounting features of said objective body are formed via a CNC machining process.

* * * * *